(12) United States Patent
Tofighi et al.

(10) Patent No.: US 11,967,291 B1
(45) Date of Patent: Apr. 23, 2024

(54) USING CONTENT TYPE TO SELECT BRIGHTNESS IN DIRECT-LIT BACKLIGHT UNITS

(71) Applicant: Apple Inc., Cupertino, CA (US)

(72) Inventors: Mohammad Tofighi, San Jose, CA (US); Meng Cao, San Jose, CA (US); Pierre-Yves Emelie, Mountain View, CA (US); Duane M Petrovich, San Francisco, CA (US); Shuo Han, San Jose, CA (US); Zhendong Hong, San Jose, CA (US); Tobias Jung, San Francisco, CA (US); Marc Albrecht, San Francisco, CA (US); Jiulong Shan, Cupertino, CA (US); Wei H Yao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/328,250

(22) Filed: Jun. 2, 2023

Related U.S. Application Data (60) Provisional application No. 63/394,552, filed on Aug. 2, 2022.

(51) Int. Cl.
| | | |
|---|---|---|
| G09G 3/34 | (2006.01) | |
| G02F 1/1335 | (2006.01) | |
| G02F 1/13357 | (2006.01) | |
| G06V 10/764 | (2022.01) | |
| G06V 10/82 | (2022.01) | |

(52) U.S. Cl.
CPC ..... *G09G 3/3426* (2013.01); *G02F 1/133603* (2013.01); *G02F 1/133612* (2021.01); *G06V 10/764* (2022.01); *G06V 10/82* (2022.01); *G09G 2320/0613* (2013.01); *G09G 2320/0626* (2013.01); *G09G 2320/066* (2013.01); *G09G 2360/16* (2013.01)

(58) Field of Classification Search
CPC ........ G02F 1/133612; G02F 1/133603; G06V 10/764; G06V 10/82; G09G 3/3426; G09G 2320/0613; G09G 2320/0626; G09G 2320/066; G09G 2360/16
See application file for complete search history.

(56) References Cited

U.S. PATENT DOCUMENTS

| | | |
|---|---|---|
| 6,903,716 B2 | 6/2005 | Kawabe et al. |
| 7,495,646 B2 | 2/2009 | Kawabe et al. |

(Continued)

*Primary Examiner* — Michael Pervan
(74) *Attorney, Agent, or Firm* — Treyz Law Group, P.C.; Joseph F. Guihan; Jinie M. Guihan (57) ABSTRACT

A display may have a pixel array such as a liquid crystal pixel array. The pixel array may be illuminated by a backlight unit that includes an array of light-emitting diodes (LEDs). The backlight unit may determine the type of content in the image data. The backlight unit may decide to prioritize either mitigating halo or mitigating clipping based on the type of content. The determination of the type of content in the image data may be used to determine the brightness values for the LEDs in the LED array. If the content is determined to be a first type of content, at least one given LED in the LED array may have a different brightness value than if the content is determined to be a second, different type of content. Classifying content in the image data may be useful in optimizing visible artifacts such as visible halo and clipping.

20 Claims, 10 Drawing Sheets

(56) References Cited

U.S. PATENT DOCUMENTS

| | | | |
|---|---|---|---|
| 7,658,529 B2 | 2/2010 | Aoki et al. | |
| 8,295,627 B2 | 10/2012 | Lin et al. | |
| 8,300,195 B2 | 10/2012 | Hwang et al. | |
| 8,456,495 B2 | 6/2013 | Fujiwara et al. | |
| 8,766,904 B2 | 7/2014 | Neal | |
| 9,066,092 B2 | 6/2015 | Seshadri et al. | |
| 9,204,138 B2 | 12/2015 | Bennett et al. | |
| 9,329,432 B2 | 5/2016 | Ek et al. | |
| 9,373,287 B2 | 6/2016 | Margerm et al. | |
| 9,672,445 B2 | 6/2017 | Osindero et al. | |
| 9,740,046 B2 | 8/2017 | Wyatt | |
| 10,263,701 B2 | 4/2019 | Aoyama et al. | |
| 10,264,225 B2 | 4/2019 | Seetzen et al. | |
| 10,504,453 B1 | 12/2019 | Jung et al. | |
| 10,951,875 B2 * | 3/2021 | Wetzstein | G06T 7/0002 |
| 10,964,275 B2 * | 3/2021 | Petrovich | G02F 1/133603 |
| 2005/0104839 A1 | 5/2005 | Baik | |
| 2008/0186393 A1 | 8/2008 | Lee et al. | |
| 2009/0322800 A1 | 12/2009 | Atkins | |
| 2011/0090261 A1 | 4/2011 | Kang et al. | |
| 2011/0279482 A1 | 11/2011 | Neal | |
| 2011/0310116 A1 | 12/2011 | Mujis | |
| 2012/0306942 A1 | 12/2012 | Fujiwara et al. | |
| 2012/0327136 A1 | 12/2012 | Uehara et al. | |
| 2015/0194083 A1 | 7/2015 | Sinha et al. | |
| 2017/0110069 A1 | 4/2017 | Shoshan et al. | |
| 2018/0166005 A1 | 6/2018 | Lee et al. | |
| 2019/0327526 A1 * | 10/2019 | Navin | H04N 21/25891 |
| 2020/0014904 A1 * | 1/2020 | Wetzstein | H04N 13/15 |
| 2020/0275133 A1 | 8/2020 | Ni et al. | |
| 2020/0335047 A1 * | 10/2020 | Petrovich | G09G 3/3426 |
| 2021/0203904 A1 * | 7/2021 | Wetzstein | H04N 13/327 |

\* cited by examiner

USING CONTENT TYPE TO SELECT BRIGHTNESS IN DIRECT-LIT BACKLIGHT UNITS

This application claims priority to U.S. provisional patent application No. 63/394,552, filed Aug. 2, 2022, which is hereby incorporated by reference herein in its entirety.

BACKGROUND

This relates generally to displays, and, more particularly, to backlit displays.

Electronic devices often include displays. For example, computers and cellular telephones are sometimes provided with backlit liquid crystal displays. Edge-lit backlight units have light-emitting diodes that emit light into an edge surface of a light guide plate. The light guide plate then distributes the emitted light laterally across the display to serve as backlight illumination. Direct-lit backlight units have arrays of light-emitting diodes that emit light vertically through the display.

Direct-lit backlights may have locally dimmable light-emitting diodes that allow dynamic range to be enhanced and power consumption to be reduced. If care is not taken, however, a direct-lit backlight may be bulky or may produce undesired visible artifacts.

SUMMARY

An electronic device may include a pixel array configured to display frames of image data and a backlight unit having light-emitting diodes that are configured to produce backlight illumination for the pixel array. The backlight unit may be configured to receive image data, identify a content type probability based on the image data, and select brightness values for the light-emitting diodes based at least on the content type probability.

An electronic device may include a pixel array and a direct-lit backlight unit having light-emitting diodes that are configured to produce backlight illumination for the pixel array. The pixel array overlaps the light-emitting diodes and the direct-lit backlight unit may be configured to select brightness values for the light-emitting diodes based at least on a content type probability that is determined using a neural network.

A method of operating a backlight unit that includes light-emitting diodes and that provides backlight illumination for a pixel array may include receiving a frame of image data that is configured to be displayed on the pixel array, determining a probability that the frame of image data represents a given type of content using the frame of image data, and determining brightness values for the light-emitting diodes using the frame of image data and the probability.

DETAILED DESCRIPTION

Figure 1:
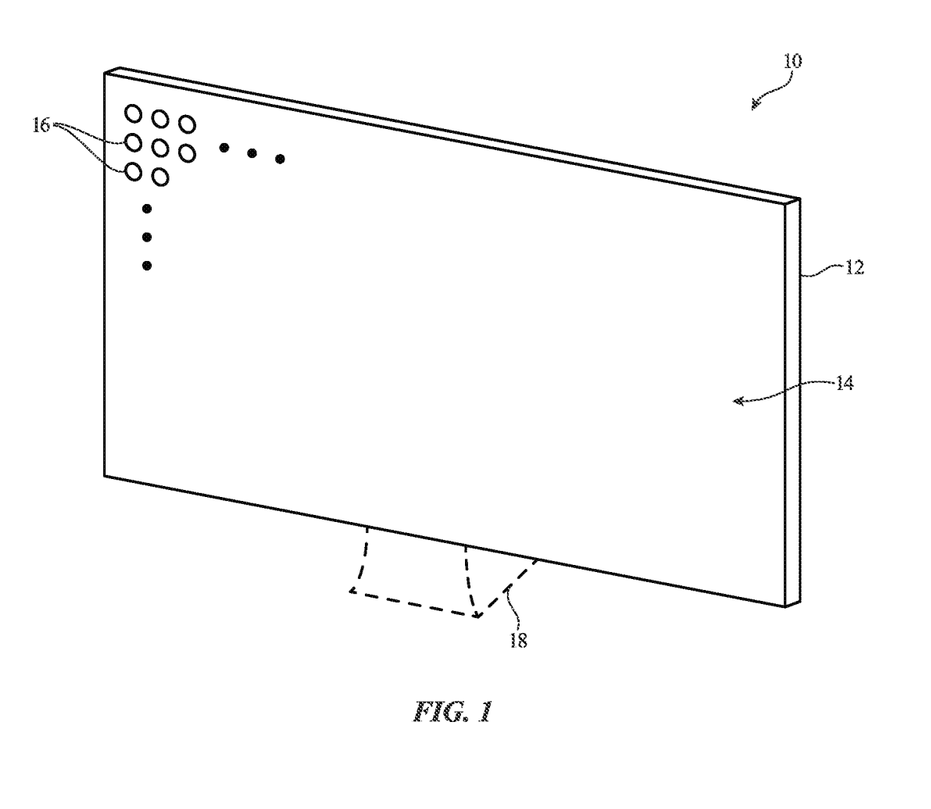
FIG. 1 is a diagram of an illustrative electronic device having a display in accordance with some embodiments.

Electronic devices may be provided with backlit displays. The backlit displays may include liquid crystal pixel arrays or other display structures that are backlit by light from a direct-lit backlight unit. A perspective view of an illustrative electronic device of the type that may be provided with a display having a direct-lit backlight unit is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may have a display such as display 14. Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing 12 may have a stand such as optional stand 18, may have multiple parts (e.g., housing portions that move relative to each other to form a laptop computer or other device with movable parts), may have the shape of a cellular telephone or tablet computer (e.g., in arrangements in which stand 18 is omitted), and/or may have other suitable configurations. The arrangement for housing 12 that is shown in FIG. 1 is illustrative.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels 16 formed from liquid crystal display (LCD) components or may have an array of pixels based on other display technologies. A cross-sectional side view of display 14 is shown in FIG. 2.

Figure 2:
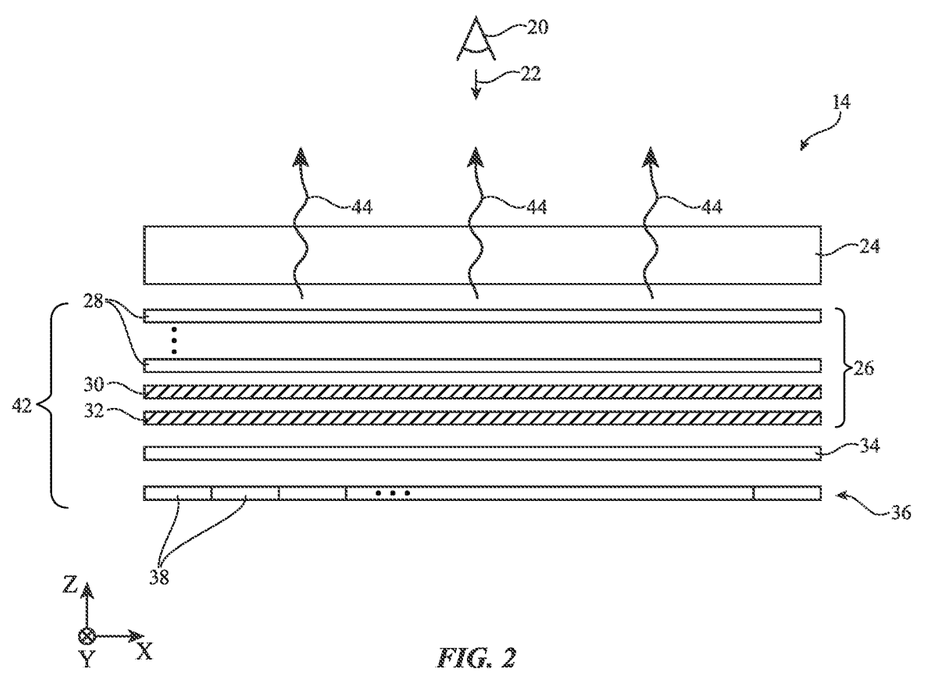
FIG. 2 is a cross-sectional side view of an illustrative display in accordance with some embodiments.

As shown in FIG. 2, display 14 may include a pixel array such as pixel array 24. Pixel array 24 may include an array of pixels such as pixels 16 of FIG. 1 (e.g., an array of pixels having rows and columns of pixels 16). Pixel array 24 may be formed from a liquid crystal display module (sometimes referred to as a liquid crystal display or liquid crystal layers) or other suitable pixel array structures. A liquid crystal display for forming pixel array 24 may, as an example, include upper and lower polarizers, a color filter layer and a thin-film transistor layer interposed between the upper and lower polarizers, and a layer of liquid crystal material interposed between the color filter layer and the thin-film transistor layer. Liquid crystal display structures of other types may be used in forming pixel array 24, if desired.

During operation of 14, images may be displayed on pixel array 24. Backlight unit 42 (which may sometimes be referred to as a backlight, backlight layers, backlight structures, a backlight module, a backlight system, etc.) may be used in producing backlight illumination 44 that passes through pixel array 24. This illuminates any images on pixel array 24 for viewing by a viewer such as viewer 20 who is viewing display 14 in direction 22.

Backlight unit 42 may have optical films 26, a light diffuser such as light diffuser (light diffuser layer) 34, and light-emitting diode array 36. Light-emitting diode array 36 may contain a two-dimensional array of light sources such as light-emitting diodes 38 that produce backlight illumination 44. Light-emitting diodes 38 may, as an example, be arranged in rows and columns and may lie in the X-Y plane of FIG. 2.

The light produced by each light-emitting diode 38 may travel upwardly along dimension Z through light diffuser 34 and optical films 26 before passing through pixel array 24. Light diffuser 34 may contain light-scattering structures that diffuse the light from light-emitting diode array 36 and thereby help provide uniform backlight illumination 44. Optical films 26 may include films such as dichroic filter 32, phosphor layer 30, and films 28. Films 28 may include brightness enhancement films that help to collimate light 44 and thereby enhance the brightness of display 14 for user 20 and/or other optical films (e.g., compensation films, etc.).

Light-emitting diodes 38 may emit light of any suitable color. With one illustrative configuration, light-emitting diodes 38 emit blue light. Dichroic filter layer 32 may be configured to pass blue light from light-emitting diodes 38 while reflecting light at other colors. Blue light from light-emitting diodes 38 may be converted into white light by a photoluminescent material such as phosphor layer 30 (e.g., a layer of white phosphor material or other photoluminescent material that converts blue light into white light). If desired, other photoluminescent materials may be used to convert blue light to light of different colors (e.g., red light, green light, white light, etc.). For example, one layer 30 (which may sometimes be referred to as a photoluminescent layer or color conversion layer) may include quantum dots that convert blue light into red and green light (e.g., to produce white backlight illumination that includes, red, green, and blue components, etc.). Configurations in which light-emitting diodes 38 emit white light (e.g., so that layer 30 may be omitted, if desired) may also be used.

In configurations in which layer 30 emits white light such as white light produced by phosphorescent material in layer 30, white light that is emitted from layer 30 in the downwards (−Z) direction may be reflected back up through pixel array 24 as backlight illumination by dichroic filter layer 32 (i.e., layer 32 may help reflect backlight outwardly away from array 36). In configurations in which layer 30 includes, for example, red and green quantum dots, dichroic filter 32 may be configured to reflect red and green light from the red and green quantum dots, respectively to help reflect backlight outwardly away from array 36. By placing the photoluminescent material of backlight 42 (e.g., the material of layer 30) above diffuser layer 34, light-emitting diodes 38 may be configured to emit more light towards the edges of the light-emitting diode cells (tiles) of array 36 than at the centers of these cells, thereby helping enhance backlight illumination uniformity.

Figure 3:
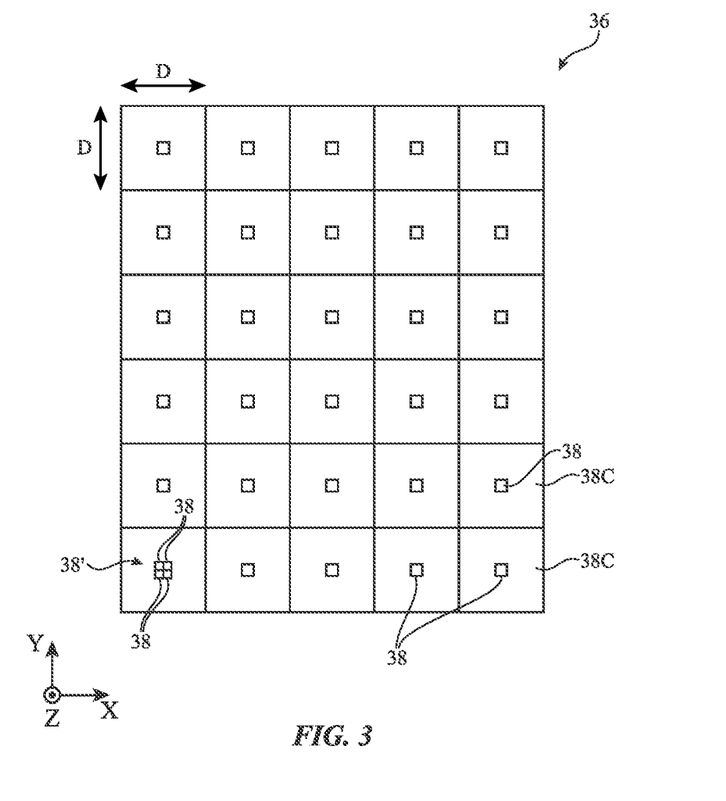
FIG. 3 is a top view of an illustrative light-emitting diode array for a direct-lit backlight unit in accordance with some embodiments.

FIG. 3 is a top view of an illustrative light-emitting diode array for backlight 42. As shown in FIG. 3, light-emitting diode array 36 may contain rows and columns of light-emitting diodes 38. Each light-emitting diode 38 may be associated with a respective cell (tile area) 38C. The length D of the edges of cells 38C may be 2 mm, 18 mm, 1-10 mm, 1-4 mm, 10-30 mm, more than 5 mm, more than 10 mm, more than 15 mm, more than 20 mm, less than 25 mm, less than 20 mm, less than 15 mm, less than 10 mm, or other suitable size. If desired, hexagonally tiled arrays and arrays with light-emitting diodes 38 that are organized in other suitable array patterns may be used. In arrays with rectangular cells, each cell may have sides of equal length (e.g., each cell may have a square outline in which four equal-length cell edges surround a respective light-emitting diode) or each cell may have sides of different lengths (e.g., a non-square rectangular shape). The configuration of FIG. 3 in which light-emitting diode array 36 has rows and columns of square light-emitting diode regions such as cells 38C is merely illustrative.

In some cases, each cell 38C may include a single light-emitting diode. Alternatively, each cell 38C may have a light source that is formed form an array of light-emitting diode dies (e.g., multiple individual light-emitting diodes 38 arranged in an array such as a 2×2 cluster of light-emitting diodes at the center of each cell 38C). For example, light source 38' in the leftmost and lowermost cell 38C of FIG. 3 has been formed from a 2×2 array of light-emitting diodes 38 (e.g., four separate light-emitting diode dies). The diodes 38 in light source 38' may be mounted on a common package substrate, may be mounted on a printed circuit board substrate that extends across array 36, or may be mounted in array 36 using other suitable arrangements. In general, each cell 38C may include a light source 38' with a single light-emitting diode 38, a pair of light-emitting diodes 38, 2-10 light-emitting diodes 38, at least two light-emitting diodes 38, at least 4 light-emitting diodes 38, at least eight light-emitting diodes 38, fewer than five light-emitting diodes 38, or other suitable number of light-emitting diodes. Illustrative configurations in which each cell 38C has a single light-emitting diode 38 may sometimes be described herein as an example. This is, however, merely illustrative. Each cell 38C may have a light source 38 with any suitable number of one or more light-emitting diodes 38.

Light-emitting diodes 38 may be controlled in unison by control circuitry in device 10 or may be individually controlled. Controlling the light-emitting diodes individually may enable the electronic device to implement a local dimming scheme that helps improve the dynamic range of images displayed on pixel array 24 and that potentially reduces the power consumption of the backlight. The dynamic range of a display may be considered the ratio between the light of the highest intensity (e.g., the brightest light) that the display is capable of emitting and the light of the lowest intensity (e.g., the dimmest light) that the display is capable of emitting.

Figure 4:
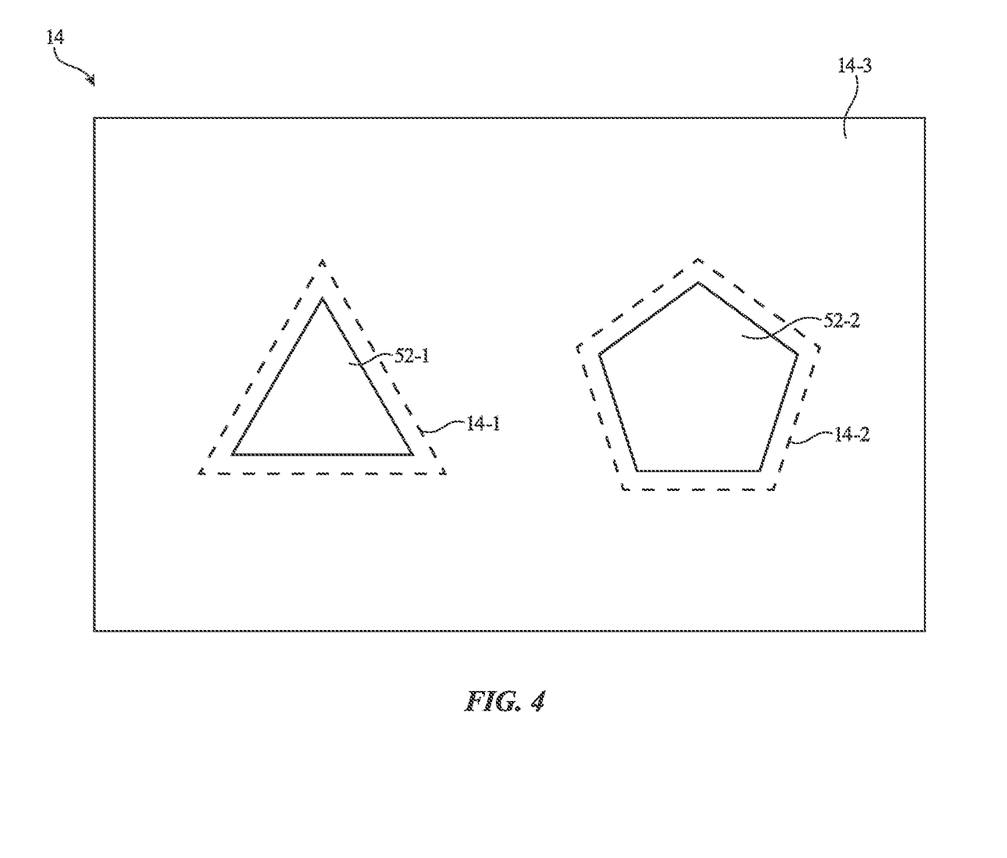
FIG. 4 is a top view of an illustrative display showing how a backlight may have a different brightness in different portions of the display in accordance with some embodiments.

If all of the light-emitting diodes in backlight unit 42 are controlled in unison, the dynamic range of the display may be limited. Consider the example depicted in FIG. 4. In FIG. 4, objects such as objects 52-1 and 52-2 are displayed on display 14 (sometimes referred to as screen 14). In this example, object 52-1 may have a high brightness level. Object 52-2 may have an intermediate brightness level. The background of the display may have a low brightness level. If the light-emitting diodes providing backlight for display 14 in FIG. 4 are controlled in unison, all of the light-emitting diodes may be set to a brightness that is optimized for object 52-1. In this scenario, object 52-1 may be displayed with its intended brightness. However, the background of the display is also receiving backlight with a high brightness optimized for object 52-1. Therefore, the background of the display may appear brighter than desired due to display limitations such as light leakage through the pixels or other limitations, and the dynamic range of the display is lower than desired. Alternatively, all of the light-emitting diodes may be set to a brightness that is optimized for the background of the display. In this scenario, the background may be displayed with its intended brightness. However, object 52-1 is also receiving backlight with a low brightness optimized for the background. Therefore, object 52-1 will appear dimmer than desired and the dynamic range of the display will be lower than desired. In yet another embodiment, the brightness of all of the light-emitting diodes may be set to a brightness that is optimized for object 52-2. In this scenario, object 52-1 will appear dimmer than desired and the background will appear brighter than desired.

Additionally, controlling all of the light-emitting diodes in backlight unit 42 in unison may introduce power consumption limitations. The maximum allowable power consumption of the backlight unit may prevent all of the light-emitting diodes from being operated at a peak brightness level. For example, all of the light-emitting diodes may not be able to emit light with a desired brightness for bright object 52-1 while meeting power consumption requirements.

To summarize, operating all of the light-emitting diodes in the backlight in unison such that the backlight brightness is the same across the display forces trade-offs in the aesthetics of the displayed image. Portions of the display may be dimmer than desired or brighter than desired and the dynamic range across the display will be lower than desired.

To increase the dynamic range of the display (and to allow for peak brightness levels without exceeding power consumption requirements), the light-emitting diodes in backlight unit 42 may be controlled individually. For example, light emitting diodes in region 14-1 of the display may have a high brightness optimized for the high brightness of object 52-1, light-emitting diodes in region 14-2 of the display may have a brightness optimized for the intermediate brightness of object 52-2, and light-emitting diodes in region 14-3 of the display may have a low brightness optimized for the low brightness of the background of the display. In one example, the light-emitting diodes in region 14-1 may operate at a maximum brightness whereas the light-emitting diodes in background region 14-3 may be turned off (e.g., operate at a minimum brightness). Varying the brightness of the light-emitting diodes across the display in this manner increases the dynamic range of the display.

Although varying the brightness of the light-emitting diodes in backlight 42 increases the dynamic range of the display, varying the brightness in this manner presents numerous challenges. In some cases, varying the brightness of the light-emitting diodes may lead to visible artifacts such as clipping (sometimes referred to as washout) and/or halo (e.g., an undesirably bright ring around a bright object due to light leakage from the backlight). Maximum power consumption issues may need to be accounted for when varying the brightness of the light-emitting diodes. Additional factors such as the display content may also be factors for controlling brightness across the display. The display circuitry described herein is configured to vary brightness of the light-emitting diodes in a backlight while mitigating visible artifacts and taking into account power considerations and other electronic device operating conditions.

Figure 5:
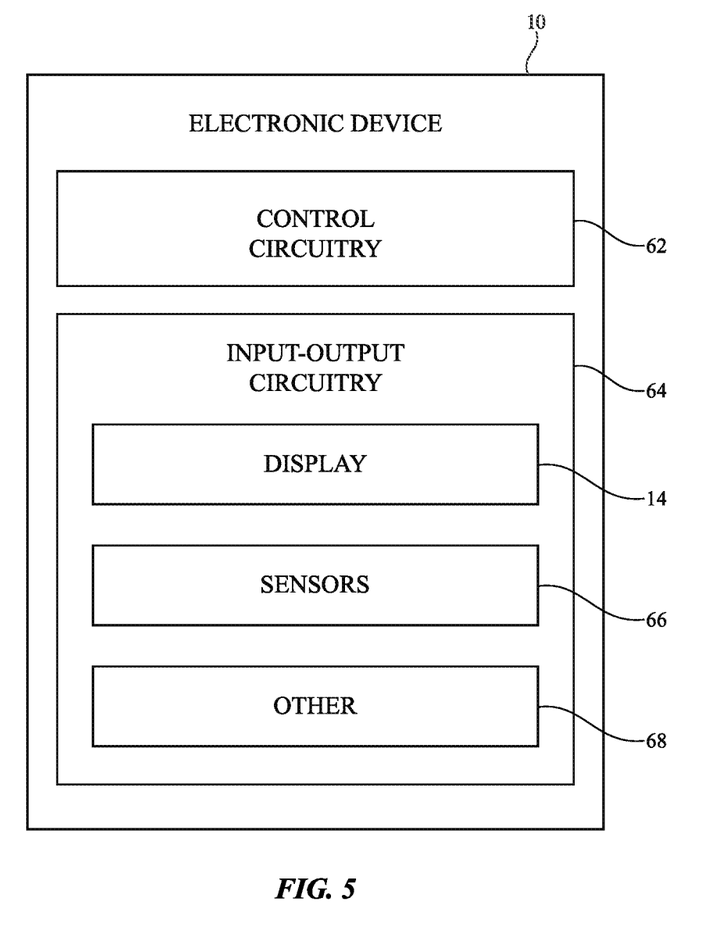
FIG. 5 is a schematic diagram of an illustrative electronic device having a display with a direct-lit backlight unit in accordance with some embodiments.

FIG. 5 is a schematic diagram of an illustrative electronic device with a display and control circuitry for operating the display. As shown in FIG. 5, electronic device 10 may have control circuitry 62. Control circuitry 62 may be configured to perform operations in electronic device 10 using hardware (e.g., dedicated hardware or circuitry), firmware and/or software. Software code for performing operations in head-mounted device 10 and other data is stored on non-transitory computer readable storage media (e.g., tangible computer readable storage media) in control circuitry 62. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 62. The processing circuitry may include application-specific integrated circuits with processing circuitry, one or more microprocessors, digital signal processors, graphics processing units, a central processing unit (CPU) or other processing circuitry.

Device 10 may include input-output circuitry 64. Input-output circuitry 64 may be used to allow data to be received by device 10 from external equipment (e.g., a tethered or remote/wireless computer, a portable device such as a handheld device or laptop computer, or other electrical equipment) and to allow a user to provide device 10 with user input. Input-output circuitry 64 may also be used to gather information on the environment in which device 10 is operating. Output components in circuitry 64 may allow device 10 to provide a user with output and may be used to communicate with external electrical equipment. As shown in FIG. 5, input-output circuitry 64 may include a display such as display 14. Display 14 may be used to display images for a user of device 10.

Sensors 66 in input-output devices 64 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 66 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 66 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

If desired, electronic device 10 may include additional components (see, e.g., other devices 68 in input-output devices 12). The additional components may include haptic output devices (e.g., an actuator such as a piezoelectric actuator), audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communicate on with ancillary equipment and for receiving wired power, and other circuitry.

Figure 6:
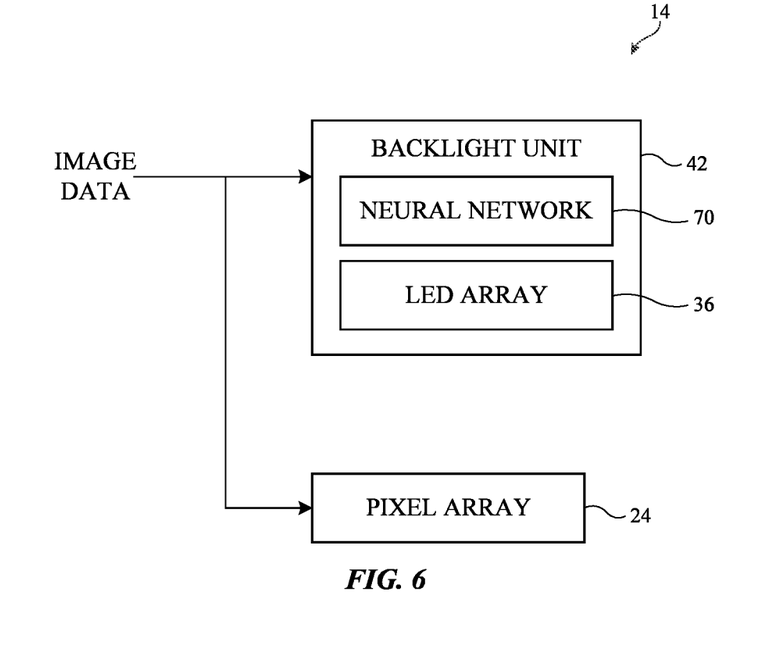
FIG. 6 is a schematic diagram of an illustrative display having a backlight unit with a neural network used to categorize content in accordance with some embodiments.

FIG. 6 is a schematic diagram of a display 14 with a variable brightness direct-lit backlight (sometimes referred to as a two-dimensional backlight). As shown in FIG. 6, display 14 includes backlight unit 42 with LED array 36. Display 14 also includes pixel array 24. Display 14 may display data in a series of frames at a desired frame rate (e.g., 60 Hz, 120 Hz, less than 60 Hz, greater than 60 Hz, greater than 100 Hz, greater than 120 Hz, etc.). For each frame, pixel array 24 may receive image data for the given frame and display the image data. Backlight unit 42 may also receive the image data for the given frame. The backlight unit (e.g., a portion of control circuitry 62) may use the image data for the given frame to determine brightness values for each light-emitting diode in LED array 36. Depending on the brightness variation within the image data, different LEDs within two-dimensional LED array 36 may have different brightness values (e.g., as shown in FIG. 5). In some cases, as shown in FIG. 6, the backlight unit 42 may include a neural network that is used to classify content in the image data. The determination of the type of content in the image data is then used to determine the brightness values for the LEDs in LED array 36. If the content is determined to be a first type of content, at least one given LED in the LED array may have a different brightness value than if the content is determined to be a second, different type of content.

Classifying content in the image data may be useful, for example, in optimizing visible artifacts such as visible halo and clipping. Consider an example where a very bright object is displayed on a dark background. The light-emitting diode(s) for the bright portion of the image may have a corresponding high brightness. The light-emitting diodes for the dark background may have a corresponding low brightness. Despite the low brightness of the light-emitting diodes in the dark background, bright light from the brightly lit light-emitting diodes may leak into the dark background. As a result, the dark background may have a portion that surrounds the brightly lit object that is detectably brighter than the remaining portion of the dark background. This undesirably bright ring around the bright object may be referred to as a halo or a halo effect.

To reduce the halo effect, the peak brightness of the backlight light-emitting diodes may be reduced. However, reducing peak brightness sacrifices dynamic range in the display. Reducing the peak brightness of the backlight light-emitting diodes may cause clipping (sometimes referred to as washout). Clipping refers to certain content appearing dimmer than desired (e.g., contrast is lower than desired).

There is therefore a tradeoff between increasing the peak brightness of the backlight (which will mitigate clipping but increase visible halos) and reducing the peak brightness of the backlight (which will mitigate visible halos but increase clipping). Backlight unit 42 may decide to prioritize either mitigating halo or mitigating clipping based on a type of content that is being displayed.

Content on display 14 may sometimes be categorized as either user-interface (UI) content (sometimes referred to as computer graphics content, text content, web page content, etc.) or non-user-interface (non-UI) content (sometimes referred to as filmed content, photo content, video content, etc.). Examples of UI content include text, web pages, applications, and other computer graphics. The UI content is generated by the electronic device and is not based on images captured by a physical camera (e.g., pictures or videos). Examples of non-UI content include photos and videos (e.g., images captured by a physical camera).

When UI content is displayed on pixel array 24, it may be desirable for backlight unit 42 to keep the peak brightness of the backlight as high as possible. This will prioritize mitigating clipping (while potentially resulting in increased visible halos). When photo content is displayed on pixel array 24, it may be desirable for backlight unit 42 to reduce the peak brightness of the backlight. This will prioritize mitigating visible halos (over other front-of-screen parameters). Optimizing halo and clipping artifacts based on the type of content in this manner may result in an aesthetically pleasing experience for a viewer of the display (e.g., by mitigating artifacts that are most visible for a given type of content when that type of content is being displayed).

Neural network 70 in backlight unit 42 may analyze the image data for each frame to determine whether the content in that frame is UI content or photo content. Neural network 70 may be a fully connected neural network, an artificial neural network, a convolution neural network, a recurrent neural network, a modular neural network, a feedforward neural network, and/or any other type of neural network. In general, the neural network may include any desired number of hidden layers. The example of backlight unit 42 using a neural network to classify content type based on image data is merely illustrative. If desired, one or more other desired machine learning classifier types/techniques may be used instead of a neural network (e.g., perceptron, naive Bayes, decision tree, logistic regression, K-nearest neighbor, support vector machine, etc.).

In one example, neural network 70 may receive inputs that are based on the received image data and output a corresponding probability (sometimes referred to as a content type probability). The probability may represent the probability that the analyzed image data is a given type of content. For example, the probability may represent the probability ($P_{PHOTO}$) that the analyzed image data is photo content. In the example herein where neural network 70 categorizes content as either photo content or UI content, the probability subtracted from 1 may represent the probability ($P_{UI}$) that the analyzed image data is UI content (e.g., $P_{UI}=1-P_{PHOTO}$).

Figure 7:
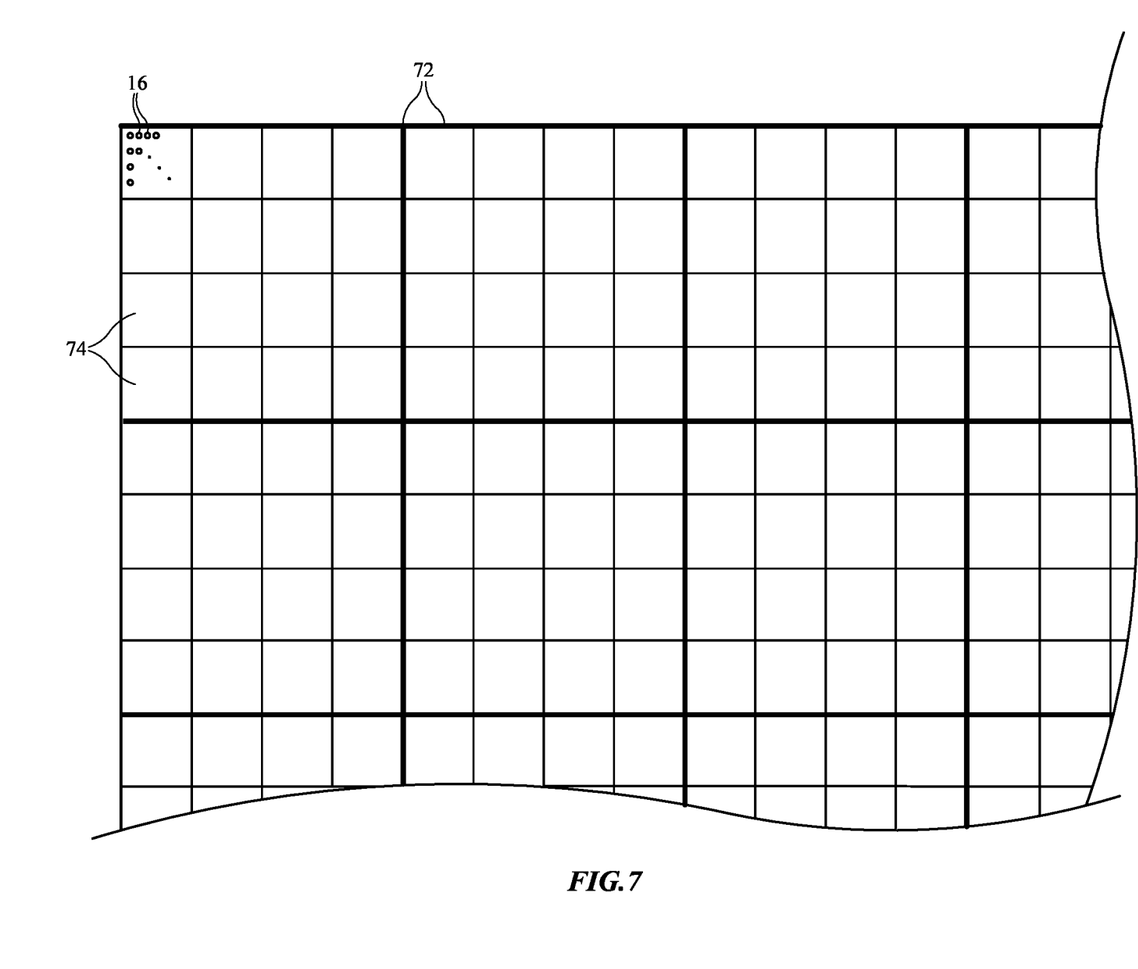
FIG. 7 is a top view of an illustrative frame of image data that is divided into a plurality of patches and a plurality of regions within the patches in accordance with some embodiments.

Neural network 70 may determine the probability that a given subset of the image data is a given type of content. As shown in FIG. 7, the frame of image data may be divided into a plurality of patches 72. The neural network may analyze each patch and determine the probability that the content in that patch is photo content.

The example of using neural network 70 to determine the probability that a given subset of the image data is a given type of content is merely illustrative. In general, any desired machine learning techniques (e.g., perceptron, naive Bayes, decision tree, logistic regression, K-nearest neighbor, support vector machine, etc.) may be used for content classification.

To determine the probability that a given patch is photo content, the patch may be divided into a plurality of regions. In the example of FIG. 7, each patch 72 is divided into a 4×4 grid of regions 74 (16 regions total). Each region 74 includes a plurality of pixels 16. In one example, each region 74 is a single corresponding LED cell (e.g., LED cell 38C in FIG. 3). In another possible example, each region 74 includes multiple LED cells.

Brightness statistics (sometimes referred to as content statistics or statistics) may be determined for the pixel data (sometimes referred to as image data or brightness data) in each patch. As one example, the backlight unit (e.g., control circuitry for the backlight unit) may determine luma information (e.g., a luma histogram), chrominance information (e.g., a chrominance histogram), and local dynamic range information (e.g., a local dynamic range histogram) for each patch. Luma represents the brightness in the image (e.g., the achromatic portion of the image). In contrast, chrominance (sometimes referred to as chroma) conveys color information for the image. The local dynamic range represents a ratio of the brightest pixel the dimmest pixel in an area surrounding a given pixel.

Consider the example of FIG. 7. For a given patch 72, a 16-bin histogram may be determined with the luma value for each pixel in the given patch 72 being placed in the appropriate bin of the histogram. The 16 values associated with the 16-bin histogram may be output to neural network 70 as the luma information for given patch 72. This process may be repeated for each patch 72.

Similarly, for a given patch 72, a 16-bin histogram may be determined with the chrominance value for each pixel in the given patch 72 being placed in the appropriate bin of the histogram. The 16 values associated with the 16-bin histogram may be output to neural network 70 as the chrominance information for given patch 72. This process may be repeated for each patch 72.

Similarly, for a given patch 72, a 16-bin histogram may be determined with the local dynamic range for each pixel in the given patch 72 being placed in the appropriate bin of the histogram. The 16 values associated with the 16-bin histogram may be output to neural network 70 as the local dynamic range information for given patch 72. This process may be repeated for each patch 72.

In the example above, neural network 70 may receive 48 inputs associated with a given patch 72. The 48 inputs include 16 values corresponding to the 16-bin luma histogram, 16 values corresponding to the 16-bin chrominance histogram, and 16 values corresponding to the 16-bin local dynamic range histogram. Neural network receives these 48 inputs associated with a given patch and outputs the probability that the given patch is photo content.

In one example, the frame of image data is divided into a 16×24 grid of patches (384 patches total) and each patch is divided into a 4×4 grid of regions (16 regions total). The neural network receives 3 brightness statistics per region as input to determine the type of content in a given patch. These examples are merely illustrative. The frame may be divided into any desired number of patches (e.g., more than 4, more than 10, more than 20, more than 50, more than 100, 192, more than 200, more than 300, 300, more than 500, more than 1,000, less than 500, less than 400, between 200 and 500, etc.). Each patch may be divided into any desired number of regions (e.g., more than 3, more than 5, more than 10, 12, more than 15, 16, more than 20, more than 30, less than 50, less than 25, less than 15, between 10 and 20, etc.). In one example, the backlight is divided into 192 patches (in a 12×16 grid), with each patch including 12 regions (in a 3×4 grid). In another example, the backlight is divided into 300 patches (in a 15×20 grid), with each patch including 12 regions (in a 3×4 grid). The neural network may receive any number of brightness statistics per region as input to determine the type of content in a given patch (e.g., more than 1, more than 2, more than 3, more than 4, more than 5, more than 8, more than 12, less than 5, less than 4, less than 3, etc.). Any number of pixels 16 may be included in each region 74 (e.g., more than 9, more than 16, more than 25, more than 100, more than 225, more than 400, more than 1,000, less than 1,000, less than 500, less than 300, less than 100, less than 50, less than 20, etc.). Any number of pixels 16 may be included in each patch 72 (e.g., more than 9, more than 16, more than 25, more than 100, more than 225, more than 400, more than 1,000, less than 1,000, less than 500, less than 300, less than 100, less than 50, less than 20, etc.). The sizes of the patches and regions may be fixed or may be adjustable.

The neural network in FIG. 6 may determine content type probabilities accurately (>99.9% confidence) while requiring a small amount of memory (e.g., less than 10 kilobytes).

After neural network 70 determines the photo content probability ($P_{PHOTO}$) for each patch in the frame of image data, the backlight unit may determine corresponding brightness values for each LED in the LED array using the image data and the probabilities. In one example, the photo content probability for a given patch and the image data for the given patch may be used to determine brightness values for LEDs in the given patch. In other words, the photo content probabilities are used locally to determine brightness values. Alternatively, the photo content probabilities for all of the patches may be used to determine a single, global representation of the photo content probabilities. As an example, the mean of the photo content probabilities may be determined. The mean photo content probability may then be used globally (as well as the image data for the frame) to determine the brightness values for each LED in the LED array.

Consider an example where the photo content probabilities for all of the patches may be used to determine a mean photo content probability. When the mean photo content probability ($P_{PHOTO\_MEAN}$) is equal to 1, it is indicative that the entire frame of image data is photo content. When the mean photo content probability is equal to 0, it is indicative that the entire frame of image data is UI content. When the mean photo content probability is equal to 0.9, it is indicative that most of the frame of image data is photo content. The selection of the LED brightness values for the backlight may err on treating content as UI content. In other words, if the mean photo content probability is equal to 0.5, the LED brightness selection may treat the image data as UI content.

Figure 8:
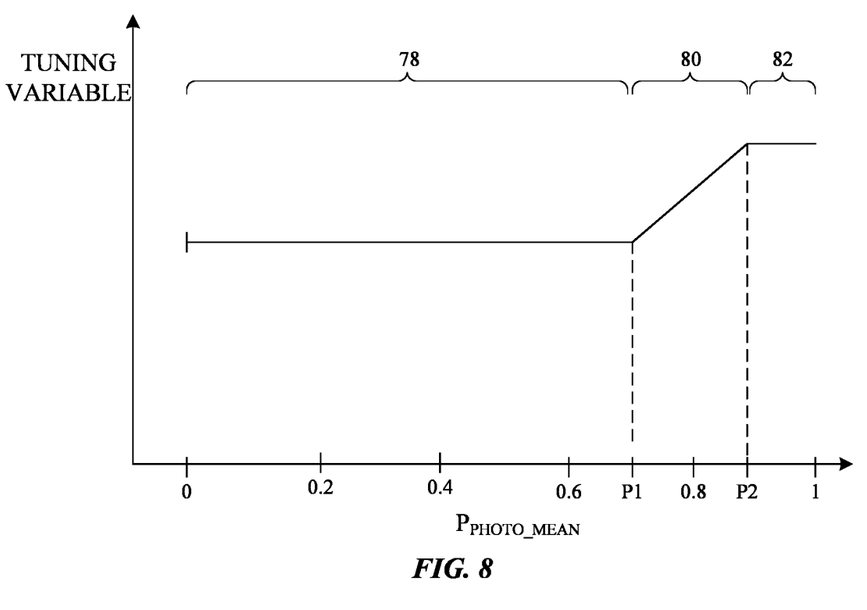
FIG. 8 is a graph of a backlight brightness selection tuning variable as a function of an average content type probability in accordance with some embodiments.

FIG. 8 shows a graph of a backlight brightness selection tuning variable as a function of $P_{PHOTO\_MEAN}$. The tuning variable is used to select LED brightness values for LED array 36. As shown, profile 76 has a first region 78 (between 0 and $P_1$) in which the tuning variable is constant at a magnitude that is optimized for UI content. Profile 76 has a region 82 (between $P_2$ and 1) in which the tuning variable is constant at a magnitude that is optimized for photo content. Profile 76 has a transition region 80 (between $P_1$ and $P_2$) in which the tuning variable gradually changes between the magnitude that is optimized for UI content (in region 78) and the magnitude that is optimized for photo content (in region 82).

In FIG. 8, $P_1$ is equal to 0.7 and $P_2$ is equal to 0.9. This example is merely illustrative. In general, $P_1$ may be less than 1, less than 0.8, less than 0.6, less than 0.4, less than 0.2, greater than 0, greater than 0.2, greater than 0.4, greater than 0.6, greater than 0.8, etc. In general, $P_2$ may be less than 1, less than 0.8, less than 0.6, less than 0.4, less than 0.2, greater than 0, greater than 0.2, greater than 0.4, greater than 0.6, greater than 0.8, etc.

The tuning variable may have any desired magnitude and may be used in any desired manner to determine LED brightness values for LED array 36. As one example, the tuning variable may be a dimming factor that is applied to the peak brightness of the LEDs. As a reminder, for UI content it may generally be desirable to keep the peak brightness high whereas for photo content is may generally be desirable to reduce the peak brightness to mitigate halo. In region 78, when $P_{PHOTO\_MEAN}$ indicates UI content is likely, the dimming factor is low (e.g., the peak brightness is not reduced or is reduced by a small amount to keep the peak brightness high). In region 82, when $P_{PHOTO\_MEAN}$ indicates photo content is likely, the dimming factor is high (e.g., the peak brightness is reduced to mitigate halo).

In general, $P_{PHOTO\_MEAN}$ may be used to determine the magnitude for one or more tuning variables. The tuning variables may subsequently be used to determine the brightness values for the LEDs 38 in LED array 36.

In the alternate example where the photo content probability for a given patch may be used locally to determine brightness values for LEDs in the given patch, $P_{PHOTO}$ for that patch may be used to determine the magnitude for one or more tuning variables that are subsequently used to determine the brightness values for the LEDs 38 in that patch. This process may repeat for each different patch in the frame. For example, a first patch may have a $P_{PHOTO}$ of 0.01 and therefore brightness values for the LEDs in the first patch are determined using the tuning variable at a magnitude that is optimized for UI content. A second patch may have a $P_{PHOTO}$ of 0.99 and therefore brightness values for the LEDs in the second patch are determined using the tuning variable at a magnitude that is optimized for photo content.

If desired, washout risk may be accounted for in addition to content type when determining brightness values for LEDs in LED array 36. To determine washout risk, additional brightness statistics may be obtained by backlight unit 42 based on the incoming image data. Specifically, the backlight unit 42 may determine the average brightness for image data associated with (e.g., overlapping) each LED cell (e.g., cell 38C in FIG. 3) and the average brightness for all of the image data. The backlight unit may also use the local dynamic range information (e.g., as discussed above for determining content type) to determine washout risk. These brightness statistics may be used to determine a washout risk for each LED cell within the LED array. The washout risks may be used in combination with the content type probabilities (and the image data for the frame) to determine LED brightness values for LED array 36.

As previously indicated, peak brightness may be reduced if $P_{PHOTO}$ is high. When factoring in washout risk, peak brightness for a given LED cell may be maintained even if $P_{PHOTO}$ is high when washout risk is also high (because visible halos may not be perceptible to the viewer). Peak brightness may be reduced for a given LED cell if $P_{PHOTO}$ is high and washout risk is low (because visible halos would be perceptible to the viewer).

Washout risk may be determined for each LED cell as a function of a brightness index (which is a function of the average brightness for the image data in that LED cell and the average brightness for all of the image data) and contrast index (which is a function of the local dynamic range for that LED cell and one or more adjacent LED cells).

When washout risk is accounted for in addition to content type when determining brightness values for LED array 36, the backlight brightness selection tuning variable(s) may be selected using a three-dimensional profile. In other words, the tuning variable(s) are a function of both washout risk and content type probability.

Figure 9:
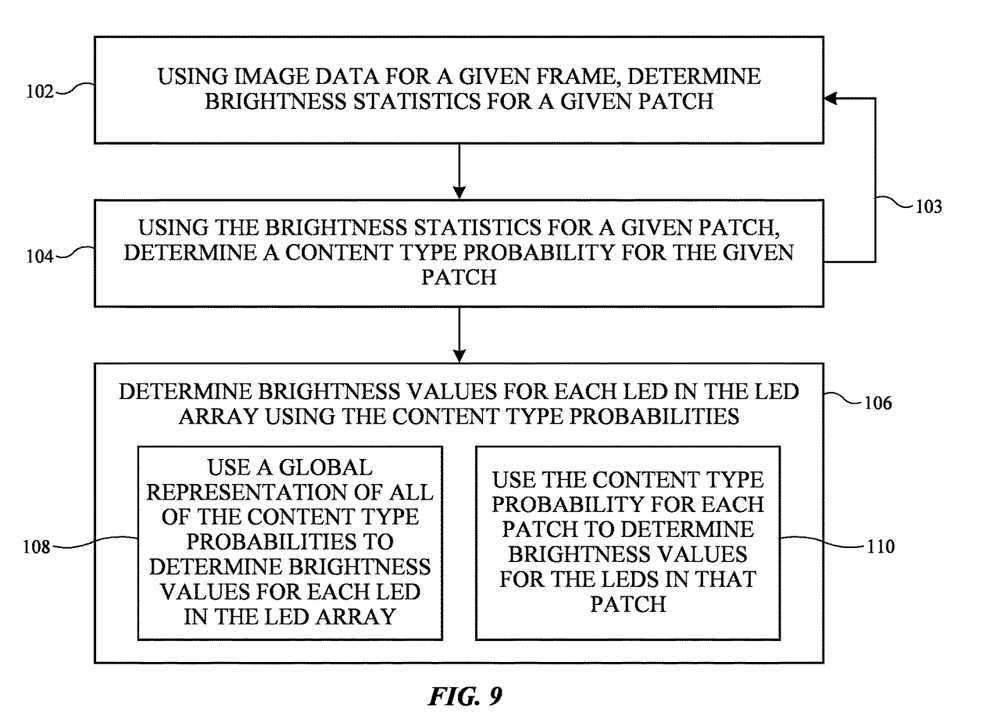
FIG. 9 is a flowchart showing an illustrative method performed by a backlight unit that uses content categorization to determine backlight brightness values in accordance with some embodiments.

FIG. 9 is a flowchart showing an illustrative method performed by a backlight unit. During the operations of block 102, the backlight unit may use image data for a given frame to determine brightness statistics (sometimes referred to as content statistics) for a given patch. As one example, the brightness statistics may include a luma histogram, a chroma histogram, and a local dynamic range histogram for each patch. This example is merely illustrative. In general, the brightness statistics (sometimes referred to as content statistics) may include any desired number of luma values for each patch, any desired number of chroma values for each patch, and any desired number of local dynamic range values for each patch. In other words, histograms with different numbers of bins may be used if desired (e.g., less than 16 bins, less than 12 bins, more than 16 bins, more than 20 bins, etc.). Alternatively, the luma information, chroma information, and/or local dynamic range information may be characterized using a technique other than histograms if desired. Other statistics other than luma, chroma, and local dynamic range (e.g., maximum brightness, minimum brightness, etc.) may also be included in the content statistics used in subsequent content categorization.

Consider the frame shown in FIG. 7. During the operations of block 102, the backlight unit may use the image data to determine a 16-bin luma histogram, a 16-bin chroma histogram, and a 16-bin local dynamic range histogram for the upper-left most patch 72 using the pixel data for the pixels included in the upper-left most patch 72.

During the operations of bock 104, neural network 70 (or other machine learning classifier within backlight unit 42) may use the brightness statistics obtained at block 102 (e.g., the brightness statistics for a given patch) to determine a content type probability for the given patch. The content type probability may be, for example, the probability that the content in the given patch is photo content (e.g., $P_{PHOTO}$) or the probability that the content in the given patch is UI content (e.g., $P_{UI}$).

Continuing the aforementioned example, the neural network may use the luma, chroma, and local dynamic range information from block 102 to determine the probability that the content in the upper-left most patch 72 in FIG. 7 is photo content.

The operations of block 102 and 104 may be repeated for each patch within the frame of image data, as indicated by loop 103 in FIG. 9.

During the operations of block 106, the backlight unit may determine brightness values for each LED in the LED array using the image data for the given frame and the content type probabilities determined at block 104. There are multiple options for how the content type probabilities may be used to determine brightness values.

In one example, shown by the operations of block 108, the backlight unit may use a single global representation of all of the content type probabilities from block 104 (in addition to the image data) to determine brightness values for each LED in the LED array. The backlight unit may average the content type probabilities from block 104 to obtain a single mean probability (e.g., $P_{PHOTO\_MEAN}$) that is used (along with the image data for the given frame) for subsequent brightness selection. The same content adjustment may be applied to all of the LEDs in LED array 36 (based on the single mean probability). As an example, the same backlight brightness selection tuning variable magnitude may be used when determining all of the brightness values for the LED array.

In another example, shown by the operations of block 110, each patch may be assessed and tuned individually. For each patch, the backlight unit may use the content type probability for that patch for brightness selection. Different content adjustments may therefore be applied to LEDs in different patches when the content type probabilities of the different patches are different. As an example, a first backlight brightness selection tuning variable magnitude may be used when determining the brightness values for the LED array in a first patch and a second, different backlight brightness selection tuning variable magnitude may be used when determining the brightness values for the LED array in a second, different patch.

In some cases, as shown in FIG. 8, a tuning variable may be determined using the content type probabilities and used for brightness determination. In block 108, the mean content type probability may be used to determine a magnitude for a tuning variable that is then used for brightness selection for all of the LEDs 38 in LED array 36. In block 110, the content type probability for each patch may be used to determine a magnitude for a tuning variable that is then used for brightness selection for all of the LEDs 38 in that patch.

In the example of FIG. 9, the content type probabilities are used to determine brightness values for the LEDs directly. Instead or in addition, the content type probabilities may be fed to other processing blocks that adjust LED brightness values (e.g., a local spatial filter, a local temporal filter, etc.). In other words, the spatial and/or temporal behavior of the LED brightness values may be content-dependent.

Figure 10:
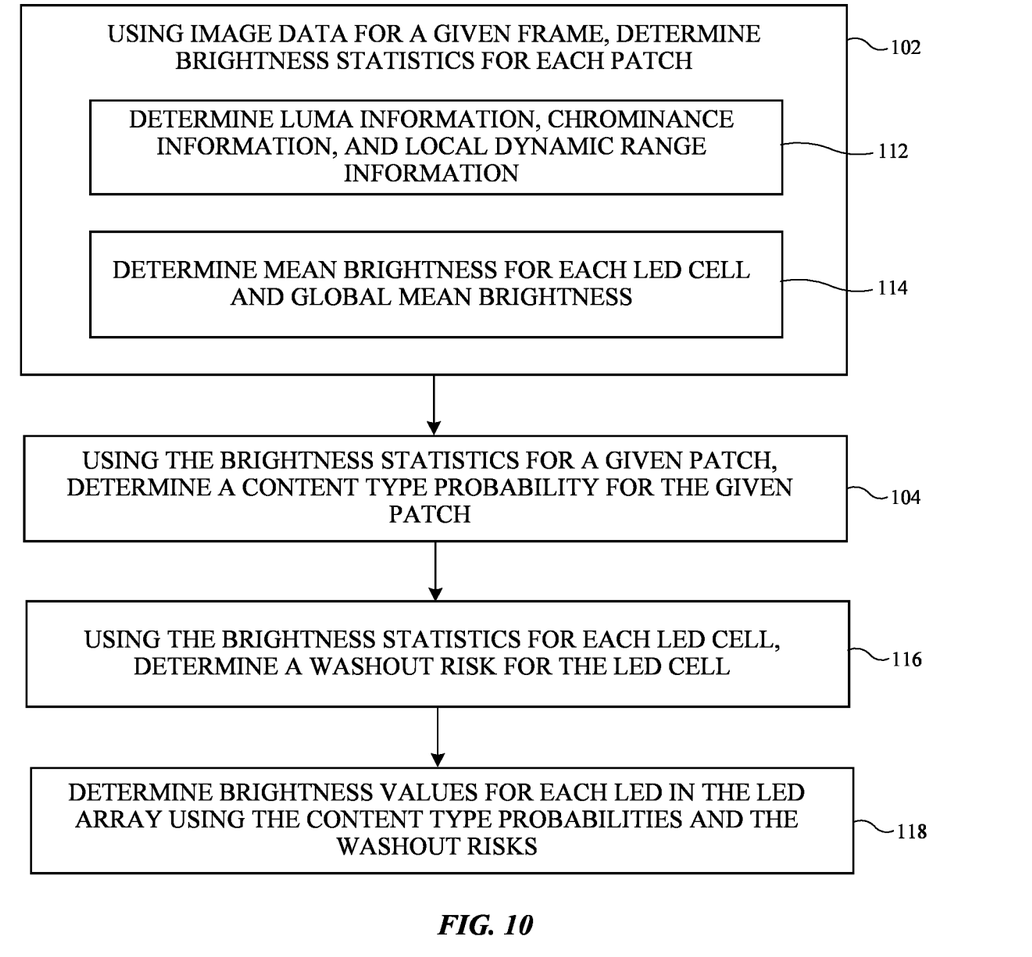
FIG. 10 is a flowchart showing an illustrative method performed by a backlight unit that uses washout risk and content categorization to determine backlight brightness values in accordance with some embodiments.

FIG. 9 shows an example where content categorization is used to determine brightness values for each LED in the LED array. If desired, washout risk may also be used to determine brightness values for each LED in the LED array. FIG. 10 is an example of this type.

FIG. 10 is a flowchart showing an illustrative method performed by a backlight unit. In FIG. 10, washout risk is used in addition to content categorization to determine brightness values for the LED array in the backlight. During the operations of block 102, the backlight unit may determine brightness statistics for each patch in the frame. Determining the statistics may include the operations of block 112 (e.g., determining luma, chrominance, and local dynamic range histograms for each patch for content categorization as discussed in connection with FIG. 9). Additionally, determining the statistics may include the operations of block 114. The operations of block 114 include determining the mean brightness for each LED cell 38C in the backlight and the global mean brightness across the entire frame. Local dynamic range information may be determined only once and then used for both determining content type probability in block 104 and determining washout risk in block 116 if desired.

At block 104, the brightness statistics from block 112 may be used to determine content type probabilities for each patch in the frame (similar to as described in connection with FIG. 9).

At block 116, the brightness statistics from block 114 may be used to determine washout risk for each LED cell in the backlight unit. The washout risk for each LED cell may be determined using the mean brightness for that LED cell, the global mean brightness, and the local dynamic range for that LED cell. The mean brightness for that LED cell and the global mean brightness may be used to determine a brightness index for that LED cell. The local dynamic range for that LED cell (and optionally one or more surrounding LED cells) may be used to determine a contrast index for that LED cell. The brightness index and the contrast index for a given LED cell may be used to determine the washout risk for that LED cell.

During the operations of block 118, the backlight unit may determine brightness values for each LED in the LED array using the content type probabilities determined at block 104 and the washout risks determined at block 116. The content type probabilities may be averaged and applied globally (as in block 108 in FIG. 9) or applied on a per-patch basis (as in block 110 in FIG. 9).

The content type probabilities and the washout risks may optionally be used to determine a tuning variable magnitude (e.g., using a three-dimensional profile as previously discussed) that is used for brightness selection.

In the example of FIG. 10, the content type probabilities and washout risk are used to determine brightness values for the LEDs directly. Instead or in addition, the content type probabilities and/or washout risk may be fed to other processing blocks that adjust LED brightness values (e.g., a local spatial filter, a local temporal filter, etc.). In other words, the spatial and/or temporal behavior of the LED brightness values may be content-dependent.

The foregoing is merely illustrative and various modifications can be made to the described embodiments. The foregoing embodiments may be implemented individually or in any combination.

What is claimed is:

1. An electronic device comprising:
a pixel array configured to display frames of image data; and
a backlight unit having light-emitting diodes that are configured to produce backlight illumination for the pixel array, wherein the backlight unit is configured to receive image data, identify a probability that the image data represents user interface content, and select brightness values for the light-emitting diodes based at least on the probability.

2. The electronic device defined in claim 1, wherein the backlight unit is configured to use a neural network to identify the probability.

3. The electronic device defined in claim 1, wherein the backlight unit is configured to, for each patch of a plurality of patches in a frame of image data, use a neural network to identify a respective probability for that patch.

4. The electronic device defined in claim 1, wherein the backlight unit is configured to determine brightness statistics associated with the image data before identifying the probability that the image data represents user interface content.

5. The electronic device defined in claim 4, wherein the light-emitting diodes are arranged in a two-dimensional array of cells and wherein the brightness statistics comprise a mean brightness for each cell and a global mean brightness.

6. The electronic device defined in claim 5, wherein the brightness statistics comprise luma information, chrominance information, and local dynamic range information.

7. The electronic device defined in claim 6, wherein the backlight unit is configured to determine a washout risk for each cell using at least the mean brightness for that cell, the global mean brightness, and the local dynamic range information for that cell and wherein selecting brightness values for the light-emitting diodes based at least on the probability comprises selecting brightness values for the light-emitting diodes based at least on the probability and the washout risk for each cell.

8. The electronic device defined in claim 7, wherein determining the washout risk for each cell comprises determining a brightness index for that cell using at least the mean brightness for that cell and the global mean brightness, determining a contrast index for that cell using at least the local dynamic range for that cell, and determining a washout risk for that cell using the brightness index for that cell and the contrast index for that cell.

9. An electronic device comprising:
a pixel array configured to display frames of image data; and
a backlight unit having light-emitting diodes that are configured to produce backlight illumination for the pixel array, wherein the backlight unit is configured to:
receive image data, identify a content type probability based on the image data, and select brightness values for the light-emitting diodes based at least on the content type probability;
for each patch of a plurality of patches in a frame of image data, use a neural network to identify a respective content type probability for that patch;
determine an average content type probability using the content type probabilities for the plurality of patches; and
select brightness values for the light-emitting diodes based at least on the average content type probability.

10. The electronic device defined in claim 9, wherein the content type probability is a probability that the image data represents user interface content.

11. An electronic device comprising:
a pixel array configured to display frames of image data; and
a backlight unit having light-emitting diodes that are configured to produce backlight illumination for the pixel array, wherein the backlight unit is configured to:
receive image data, identify a content type probability based on the image data, and select brightness values for the light-emitting diodes based at least on the content type probability;
for each patch of a plurality of patches in a frame of image data, use a neural network to identify a respective content type probability for that patch; and
for each patch of the plurality of patches, determine brightness statistics that are used by the neural network to identify the respective content type probability for that patch.

12. The electronic device defined in claim 11, wherein the brightness statistics for each patch comprise luma information, chrominance information, and local dynamic range information.

13. The electronic device defined in claim 12, wherein the plurality of patches comprises at least 150 patches.

14. The electronic device defined in claim 12, wherein the luma information comprises a luma histogram, wherein the chrominance information comprises a chrominance histogram, and wherein the local dynamic range information comprises a local dynamic range histogram.

15. An electronic device comprising:
a pixel array; and
a direct-lit backlight unit having light-emitting diodes that are configured to produce backlight illumination for the pixel array, wherein the pixel array overlaps the light-emitting diodes, wherein the direct-lit backlight unit is configured to select brightness values for the light-emitting diodes based at least on a content type probability that is determined using a neural network, and wherein the direct-lit backlight unit is configured to reduce a peak brightness of the brightness values in response to the content type probability exceeding a threshold.

16. The electronic device defined in claim 15, wherein the direct-lit backlight unit is configured to forego reducing the peak brightness of the brightness values in response to the content type probability being below the threshold.

17. The electronic device defined in claim 15, wherein the content type probability is a probability that the image data represents photo content.

18. A method of operating a backlight unit that includes light-emitting diodes and that provides backlight illumination for a pixel array, the method comprising:
receiving a frame of image data that is configured to be displayed on the pixel array;
using the frame of image data, determining a probability that the frame of image data represents photo content; and
using the frame of image data and the probability, determining brightness values for the light-emitting diodes.

19. The method defined in claim 18, wherein determining the brightness values for the light-emitting diodes comprises determining brightness values of at least two different magnitudes.

20. The method defined in claim 19, wherein determining the probability that the frame of image data represents photo content comprises using a neural network to identify the probability.

* * * * *